United States Patent
Elliott et al.

[15] 3,645,795
[45] Feb. 29, 1972

[54] ELECTROCHEMICAL CELLS

[72] Inventors: William E. Elliott, Elmgrove; James R. Huff, Milwaukee, both of Wis.

[73] Assignee: Globe Union Inc., Milwaukee, Wis.

[22] Filed: Dec. 7, 1966

[21] Appl. No.: 599,759

[52] U.S. Cl. .........................................................136/86 A
[51] Int. Cl. ......................................................H01m 27/00
[58] Field of Search ................................136/86, 6, 153, 83

[56] References Cited

UNITED STATES PATENTS

| | | | |
|---|---|---|---|
| 2,855,452 | 10/1958 | Morehouse et al. | 136/120 |
| 2,921,110 | 1/1960 | Crowley et al. | 136/86 |
| 3,160,526 | 12/1964 | Ruetschi | 136/153 |
| 3,185,590 | 5/1965 | Mayer et al. | 136/153 |
| 3,279,952 | 10/1966 | Minnick | 136/100 |
| 3,393,093 | 7/1968 | Shaw | 136/6 |

OTHER PUBLICATIONS

Research and Development of a High Capacity Nonaqueous Secondary Battery by K. R. Hill and R. G. Selim, Aug. 15, 1965, page 1.

*Primary Examiner*—Winston A. Douglas
*Assistant Examiner*—H. A. Feeley
*Attorney*—Pendleton, Neuman, Williams & Anderson

[57] ABSTRACT

Electrochemical primary and secondary cells which utilize alkali or alkaline earth metal anodes such as lithium, potassium, sodium, calcium and magnesium, and catalytic air electrodes which utilize components of the atmosphere, namely, oxygen and water as a source of electrochemical power. The electrolyte system in the electrochemical cells comprises a nonaqueous electrolyte solvent, namely, an organic solvent of sufficient polarity to dissolve an electrolyte salt.

10 Claims, 4 Drawing Figures

PATENTED FEB 29 1972

INVENTORS
WILLIAM E. ELLIOTT
JAMES R. HUFF
BY
PENDLETON, NEUMAN
SEIBOLD & WILLIAMS
ATTORNEYS

ELECTROCHEMICAL CELLS

This invention relates to electrochemical primary and secondary cells and more particularly to rechargeable electrochemical cells which consume alkali or alkaline earth metals and atmospheric components as a source of electrochemical power.

The desirability of producing an electrochemical cell of high-energy density coupled with relatively low cost, safety, reliability and using commercially available fuel elements has been appreciated by researchers in this art for many years.

Accordingly one of the objects of the present invention is the production of an electrochemical cell which derives its energy from alkali and alkaline earth metals and atmospheric components.

Another object of this invention is the provision of an electrochemical cell which has a high-energy density.

A still further object is the provision of an electrochemical cell which operates at conventional ambient temperatures.

Another object is the provision of an electrochemical cell that does not require activation time for the production of electrical energy.

Another object is the provision of an electrochemical cell which operates at a relatively high voltage.

Another object is the provision of an electrochemical cell which is a continuously operating primary cell and which requires replacement of only a single electrode.

A still further object is the provision of an electrochemical cell in which one electrode half-cell reaction utilizes components of the atmosphere, namely, water and oxygen.

A still further object is the provision of an electrochemical cell which is capable of functioning as a secondary cell in which only the anode operates as a secondary or rechargeable electrode.

Still another object is the provision of an electrochemical cell which is economical, safe and does not produce deleterious byproducts in the electrode reaction.

A still further object is the provision of an electrochemical cell which uses a nonaqueous electrolyte system.

A still further object is the provision of an electrochemical cell which is capable of functioning as a secondary cell.

A still further object is the provision of an electrochemical cell which is capable of producing high-energy densities operating either as a primary or secondary cell.

The fulfillment of these and other objects may be seen in the following specification, appended claims and attached drawing.

Accordingly, in one broad form, the present invention is an electrochemical cell comprising an alkali or alkaline earth metal anode, an air-breathing catalytic cathode and a compatible nonaqueous electrolyte.

The anode used in the electrochemical cells of the present invention is of elemental alkali or alkaline earth metal, such as lithium, potassium, sodium, calcium, magnesium, or the like, of which lithium is most preferred. In one preferred form, the anode metal is impressed or affixed upon a high conductivity support matrix, such as for example, silver, copper, nickel or magnesium in the form of a screen, grid or the like.

The cathode used in the electrochemical cells of this invention is a porous, air-permeable conductive substrate coated or impregnated with a catalyst. A catalyst, as the term is used herein, includes any catalyst capable of reducing oxygen on a conductive surface. Exemplary of such catalysts are platinum black, platinum oxide, Raney silver and the like. The catalytic electrodes useful herein may also be described as nonsacrificial, conductive, air-breathing electrodes. Exemplary of such electrodes are conventional fuel cell electrodes, such as Allis-Chalmers Hysac silver electrodes and American Cyanamid Type AA-1 noble metal electrodes. Generally they are of a microporous or sintered conductive structure, such that they will permit passage of air and water vapor, and will permit controlled penetration of electrolyte into the electrode body and permit the reduction of oxygen in a reaction with water.

The electrolyte system used in the present invention is a nonaqueous electrolyte solvent and a soluble electrolyte salt.

The nonaqueous electrolyte solvent preferably has sufficient solvent capacity to dissolve an electrolyte salt or solute which is used in conjunction therewith to provide the aforesaid system of solvent and salt. By sufficient solvent capacity we mean that the salts which may be used as electrolyte salts can be dissolved in sufficient concentration to provide an electrolyte system of a specific conductivity suitable for use in a primary cell system of the type herein described or more particularly having a specific conductivity of at least $10^{-3}$ ohms$^{-1}$ cm.$^{-1}$. The electrolyte solvent should be compatible with the electrodes used herein, since metals such as lithium are capable of reacting with solvents containing active hydrogen atoms, which interaction results in the destruction of the anode material. The term "compatible" includes compatibility with the basic electrode reaction since in some instances it is preferred that the anode half-cell end products should remain in a solid porous state on the electrode surface. This is especially important in considering operation of the cell as a secondary cell, which will be more fully described hereinafter.

The solvents which may be utilized include $\gamma$-butyrolactone, propylene carbonate, liquid mixtures of propylene and ethylene carbonate and disubstituted nitrosoamines of the formula

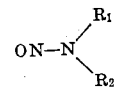

wherein $R_1$ and $R_2$ are each independently selected from the group of alkyl groups containing up to about four carbon atoms. These may be exemplified by N-nitrosodimethylamine, N-nitrosodiethylamine, N-nitrosomethylethylamine, N-nitrosodiisopropylamine, N-nitrosodibutylamine.

Exemplary solutes or electrolyte salts, which may be utilized in the electrolyte systems, are lithium perchlorate, magnesium chloride, tetra-n-butylammonium chloride, aluminum chloride, tri-n-propylammonium hexafluoroarsenate, potassium hexafluorophosphate, tetramethylammonium hexafluorophosphate, phenyl trimethylammonium hexafluorophosphates and quaternary ammonium hydroxides. In general the solutes or electrolyte salts are preferably quaternary ammonium compounds.

For a more complete understanding of this invention reference is made to the drawings, wherein.

Figure 1:
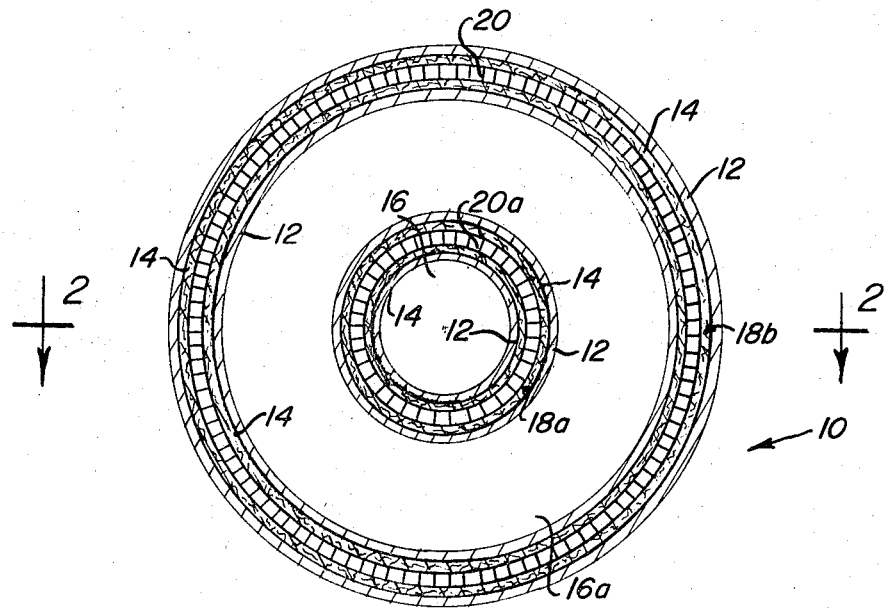
FIG. 1 is a top plan view of one embodiment of an electrochemical cell made in accordance with the present invention.
Figure 2:
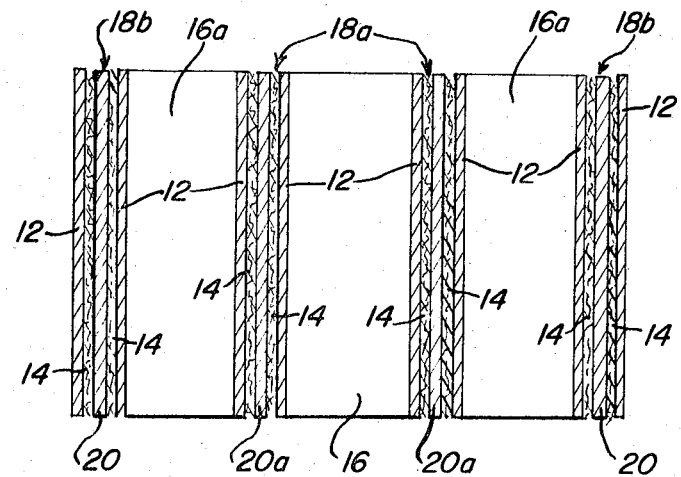
FIG. 2 is a cross-sectional view of the cell taken along the lines 2—2 of FIG. 1.

Referring to FIGS. 1 and 2 of the drawing there is shown an electrochemical cell 10 comprising cylindrical air electrodes 12 arranged in coaxial concentric fashion defining several air chambers 16 and 16$a$ in cylindrical ductlike form. The air electrodes are fabricated of air-permeable conductive material which is impregnated with a catalytic material. The electrode 12 has a microporous, foraminous, reticulated body which does not interfere with the air half-cell reaction or transfer of oxygen and moisture (or water vapor) from the air thorough the cathode wall of the cell, but serves to retain the electrolyte in the electrolyte chambers 18$a$ and 18$b$ in the form of thin shells. Disposed within the electrolyte chambers are the metallic anodes 20 and 20$a$ which are formed of an alkali or alkaline earth metal supported on a conductive screen or grid (not shown), and conductors leading from the electrodes to the terminals. A nonconductive membrane 14 permeable to the electrolyte is disposed between the air cathode and the anode.

The electrolyte is disposed within the electrolyte cell surrounding the anode providing electric contact between the anode and the air cathode.

Figure 3:
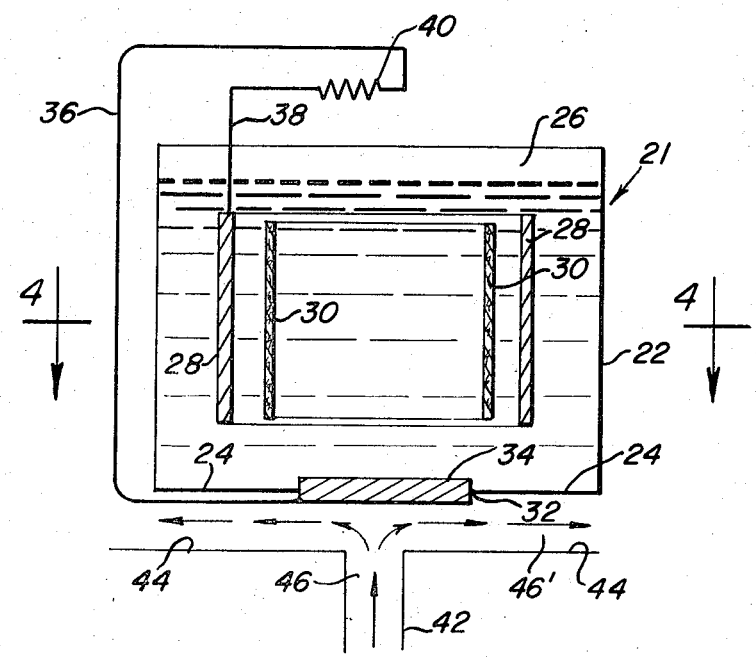
FIG. 3 is a vertical cross-sectional view of another embodiment of a primary cell prepared in accordance with the present invention.
Figure 4:
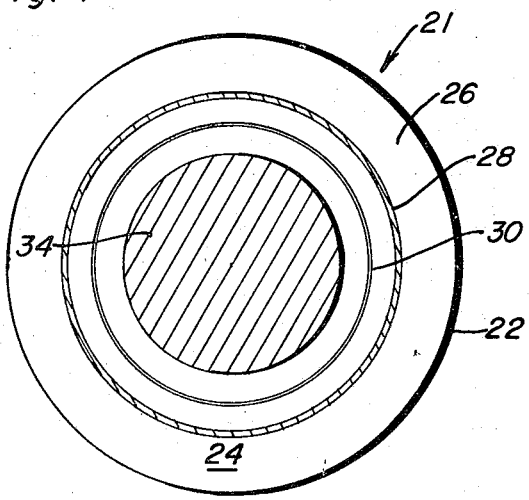
FIG. 4 is a cross-sectional view along the line 4—4 of the cell shown in FIG. 3.

Referring to FIGS. 3 and 4 of the drawing there is shown another embodiment of an electrochemical cell 21 comprising a cylinder 22 having a chambered bottom 24 and defining a cylindrical chamber or cavity 26. Disposed within the chamber is an anode 28 also in cylindrical form and a porous membrane 30 cylindrical in form within the circumference of the anode 28. In a cylindrical opening 32 in the bottom 24 of the cell 21 is a circular section of air electrode 34. Electrolyte fills the cavity 26 and conductive leads or wires 36 and 38 extend from the air-breathing cathode 34 and the anode 28, respectively, to a load or resistance element 40. FIG. 3 of the drawing also shows an air inlet 42 expanding into an essentially circular dispersion means 44 for directing air against the surface of the air electrode 34 as indicated by the arrows passing through the conduits 46 and 46' defined by the structures 42 and 44.

In one specific embodiment of this invention using a cell structure according to FIGS. 3 and 4 the electrolyte system is a 1 molal solution of phenyltrimethylammonium hexafluorophosphate in N-nitrosodimethylamine solvent. The anode is lithium metal supported on a silver grid. The cathode is an Allis-Chalmers "Hysac" silver electrode. The separator used is glass fiber filter paper. The half-cell reactions of the above-described cell made in accordance with the present invention are as follows:

At the anode: $Li \rightarrow Li^+ + e^-$
At the cathode: $\frac{1}{2}O_2 + H_2O + 2e^- \rightarrow 2OH^-$
The overall reaction is: $2Li + \frac{1}{2}O_2 + H_2O \rightleftharpoons 2LiOH$ In operation it has been found in some instances that nitrogen gas gaining entry into the electrolyte at the air electrode when atmospheric air is used, forms lithium nitride which passivates the lithium electrode surface. Moisture migrating through the electrolyte has the capacity to destroy the nitride thus formed and alleviates the effect of this competing side reaction.

It is to be further understood that while air may be used in as a source of fuel supplying both oxygen and water to complete the cathode half-cell reaction, there is quite often a stoichiometric deficiency of the moisture required. It has accordingly been found that bubbling air through water maintained at 150° F. provides an oxygen-water fuel source containing 2 mols of water for each mol of oxygen present. The parasitic power requirements for heating the water to this temperature are quite small, generally being up to about 1.2 kilowatt hours in a system having a theoretical capacity of 200 kilowatt hours. In practical operations of the cell described above, auxiliary blowers may be provided to maintain an adequate airflow.

Another important factor in the present invention is that the anode reaction product should preferably be porous to electrolyte, insoluble in the electrolyte system and have a specific volume which will not interfere with the mechanical structure of the cell. Thus, for example, lithium hydroxide, the byproduct of the lithium anode, has a molar volume of only 1.29 times that of lithium from which it is formed. The solid electrode byproduct is important when considering use of a cell as a secondary battery and replating of lithium from lithium hydroxide by the reaction:

$$LiOH + e^- \rightarrow Li + OH^-$$

Thus the electrochemical cells of the present invention are quite versatile in permitting one to operate them as a primary cell or as a secondary cell. Anodes of lithium are preferred for secondary cell operations.

The following are examples of specific cell systems prepared and operated under laboratory conditions.

EXAMPLE 1

An electrochemical cell comprising an air cathode prepared from Allis-Chalmers Hysac silver electrode material, metallic lithium (0.16 gram) 2 cm.² supported on a silver screen and a lithium perchlorate-propylene carbonate electrode system. The cathode 1 cm.² was placed over a fritted glass disc which in turn was connected with an air source outside the electrolyte bath. The airstream was pressed through a water bubbler. The concentration of lithium perchlorate was 1 molal. At room temperature the following results were obtained:

TABLE I

At ambient room temperature at 25° C.

| Cell | Voltage Anode | Cathode | Current (ma.) |
|------|------|------|------|
| 3.45 | −2.95 | +0.5 | 0 (open circuit) |
| 3.1 | −2.86 | +0.24 | 1 |
| 2.33 | −1.95 | −0.38 | 3 |

The foregoing run was carried out using atmospheric air. The following run was carried out using air passed through a water bubbler at room temperature at 25° C.

| Time (min). | Cell | Voltage Anode | Cathode | Current (ma.) |
|---|---|---|---|---|
| 0 | 2.98 | −2.96 | +0.02 | — |
| 5 | 2.19 | −2.8 | −0.62 | 2 |

The above cell demonstrates a capability of being recharged. A discharge similar to the example shown above was obtained after recharge.

A similar series of cells using the foregoing procedures were prepared. In all instances the electrolyte was 1 molal lithium perchlorate in N-nitrosodimethylamine and the catalytic cathode 1 cm.² Allis-Chalmers Hysac silver. The following results were obtained:

EXAMPLE 2

Anode: Calcium

| Load & (Time) | Cell | Voltage (volts) Anode | Cathode |
|---|---|---|---|
| Open circuit | 2.3 | −2.2 | +0.1 |
| 1 ma. (5 min.) | 1.1 | −1.8 | −0.5 |
| 2 ma. (5 min.) | 0.5 | −1.2 | −0.80 |
| Open circuit | 2.1 | −2.2 | −0.25 |

EXAMPLE 3

Anode: Magnesium

| Load & (Time) | Cell | Voltage Anode | Cathode |
|---|---|---|---|
| Open circuit (0) | 0.9 | −0.5 | +0.3 |
| 0.5 ma. (5 min.) | 0.6 | −0.50 | +0.05 |
| Open circuit | 0.9 | −0.55 | +0.3 |

EXAMPLE 4

Anode: Potassium

| Load & (Time) | Cell | Voltage Anode | Cathode |
|---|---|---|---|
| Open circuit (0) | 3.3 | −2.8 | +0.2 |
| 1 ma. (5 min.) | 2.7 | −2.4 | +0.08 |
| 2 ma. (5 min.) | 1.5 | −1.5 | −0.01 |

EXAMPLE 5

Anode: Sodium

| Load & (Time) | Cell | Voltage Anode | Cathode |
|---|---|---|---|
| Open circuit | 2.9 | −2.5 | +0.15 |
| 1 ma. (5 min.) | 2.6 | −2.45 | 0 |
| 2 ma. (5 min.) | 2.2 | −2.2 | 0.1 |

EXAMPLE 6

This example demonstrates that oxygen can be reduced on the surface of a catalytic electrode in a nonaqueous system.

A cell similar to those prepared above using 1 molal solution of phenyl-triethylammonium hexafluorophosphate in nitrosodimethylamine electrolyte, a lithium anode and bright platinum cathode. The cell was subjected to voltametric scans on a potentiostat during which the air cathode was purged alternately with a stream of nitrogen and a stream of oxygen. During the nitrogen cycle no current was observed, while during the oxygen cycle current was produced.

The foregoing examples illustrate the versatility of the electrochemical cells of the present invention.

While numerous specific examples have been given it should be understood that they are merely illustrative and other combinations of anodes, cathodes, electrolyte solvents and solutes may be employed.

While several embodiments of particular cell structures have been shown, it should be also understood that other structures may be developed and utilized in connection with the teachings disclosed herein.

We claim:

1. An electrochemical cell capable of operation at ambient conditions comprising an anode of a metal selected from the group consisting of solid alkali and alkaline earth metals, a compatible nonmolten nonaqueous organic electrolyte system comprising:

a. an electrolyte solvent selected from the group consisting of butyrolactone, propylene carbonate, liquid mixtures of propylene and ethylene carbonate and disubstituted nitrosoamines of formula:

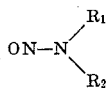

wherein $R_1$ and $R_2$ are each independently selected from the group of alkyl groups containing up to four carbon atoms, and b. an electrolyte salt; and a compatible moist air electrode.

2. An electrochemical cell according to claim 1 wherein the anode is selected from the group consisting of lithium, potassium, sodium, calcium and magnesium.

3. An electrochemical cell according to claim 1 wherein the anode is metallic lithium.

4. An electrochemical cell according to claim 1 wherein the electrolyte solvent is propylene carbonate.

5. An electrochemical cell according to claim 1 wherein the electrolyte solvent is a liquid mixture of propylene and ethylene carbonate.

6. An electrochemical cell capable of operating at ambient conditions comprising an anode of lithium, an electrolyte of lithium perchlorate/N-nitrosodimethylamine and a compatible moist air electrode.

7. An electrochemical cell capable of operating at ambient conditions comprising an anode of lithium, an electrolyte of phenyltriethylammonium hexafluorophosphate/N-nitrosodimethylamine and a compatible moist air electrode.

8. An electrochemical cell according to claim 1 wherein the electrolyte salt is selected from the group consisting of lithium perchlorate, magnesium chloride, tetra-N-butylammonium chloride, aluminum chloride, tri-N-propylammonium hexafluoroarsenate, potassium hexafluorophosphate, tetramethylammonium hexafluorophosphate, phenyl trimethylammonium hexafluorophosphate and quaternary ammonium hydroxides.

9. An electrochemical cell capable of operation at ambient conditions comprising an anode of a metal selected from the group consisting of solid alkali and alkaline earth metals, a compatible nonmolten nonaqueous organic electrolyte system comprising;

a. An electrolyte solvent selected from the group consisting of disubstituted nitrosoamines of the formula:

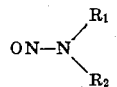

wherein $R_1$ and $R_2$ are each independently selected from the group of alkyl groups containing up to four carbon atoms, and b. an electrolyte salt; and a compatible moist air electrode.

10. An electrochemical cell according to claim 9 wherein the electrolyte solvent is N-nitrosodimethylamine.

* * * * *

UNITED STATES PATENT OFFICE
CERTIFICATE OF CORRECTION

Patent No. 3,645,795                         Dated February 29, 1972

Inventor(s) William E. Elliott and James R. Huff

It is certified that error appears in the above-identified patent and that said Letters Patent are hereby corrected as shown below:

Col. 2, l. 11  -  After "cm" delete the period "."

Col. 2, l. 42  -  "hexafluorophosphates" should be "hexafluorophosphate"

Col. 2, l. 61  -  After "duct" insert a hyphen -- - --

Col. 3, l. 40  -  After "used" delete "in"

Col. 3, l. 52  -  "airflow" should be "air flow"

Col. 3, l. 75  -  "electrode" should be "electrolyte"

Col. 4, l. 3   -  "airstream" should be "air stream"

Col. 5, l. 14  -  After "of" insert -- γ- --

Col. 5, l. 16  -  After "of" insert -- the --

Signed and sealed this 18th day of July 1972.

(SEAL)
Attest:

EDWARD M. FLETCHER, JR.            ROBERT GOTTSCHALK
Attesting Officer                  Commissioner of Patents